(12) United States Patent
Oto

(10) Patent No.: US 7,986,608 B2
(45) Date of Patent: Jul. 26, 2011

(54) LAMINATED WAVE PLATE AND OPTICAL PICKUP DEVICE USING THE SAME

(75) Inventor: Masayuki Oto, Zama (JP)

(73) Assignee: Epson Toyocom Corporation, Tokyo (JP)

( * ) Notice: Subject to any disclaimer, the term of this patent is extended or adjusted under 35 U.S.C. 154(b) by 1003 days.

(21) Appl. No.: 11/785,528

(22) Filed: Apr. 18, 2007

(65) Prior Publication Data
US 2007/0247633 A1 Oct. 25, 2007

(30) Foreign Application Priority Data

Apr. 18, 2006 (JP) .................... 2006-114120
Apr. 16, 2007 (JP) .................... 2007-106754

(51) Int. Cl.
*G11B 7/00* (2006.01)
(52) U.S. Cl. ................................. 369/112.17
(58) Field of Classification Search ............. 369/112.17, 369/112.16, 110.01, 110.02, 110.03, 110.04, 369/112.19, 112.21, 112.2
See application file for complete search history.

(56) References Cited

U.S. PATENT DOCUMENTS

| 6,268,962 | B1 * | 7/2001 | Reeder ................... 359/497 |
| 2005/0062916 | A1 * | 3/2005 | Matsumoto et al. ......... 349/117 |
| 2005/0180296 | A1 * | 8/2005 | Ooto ...................... 369/112.22 |

FOREIGN PATENT DOCUMENTS

JP     A 10-068816      3/1998
WO    WO 03/091768 A1  11/2003

* cited by examiner

*Primary Examiner* — Tan X Dinh
(74) *Attorney, Agent, or Firm* — Oliff & Berridge, PLC

(57) ABSTRACT

A laminated wave plate of the present invention includes a first wave plate having a phase difference of Γ1 and a second wave plate having a phase difference of Γ2 with respect to a wavelength λ, the first wave plate and the second wave plate being bonded together so that an optical axis of the first wave plate and an optical axis of the second wave plate intersect each other to function as a quarter-wave plate as a whole, the laminated wave plate comprising following equations from (1) to (6): $Γ1=360\times(n1+1)$ ... (1); $Γ2=90\times(2\times n2+1)$ ... (2); $ΔΓ1=(Γ12a-Γ11a)/(λ12-λ11)$ ... (3); $ΔΓ2=(Γ12b-Γ11b)/(λ12-λ11)$ ... (4); $\cos 2θ1=1-(1-\cos ΔΓ2)/\{2\times(1-\cos Δθ1)\}$ ... (5); and $θ2=45°\pm5°$ ... (6), wherein θ1 is an optic axis orientation of the first wave plate, θ2 is an optic axis orientation of the second wave plate, and each of $λ11\leq λ \leq λ12$, n1, and n2 is a natural number starting from 1.

12 Claims, 12 Drawing Sheets

VIEW FROM INCIDENT DIRECTION

HALF-WAVE PLATE 41
STRETCHING AXIS : −15°

QUARTER-WAVE PLATE 43
STRETCHING AXIS : −75°

LAMINATED WAVE PLATE AND OPTICAL PICKUP DEVICE USING THE SAME

FIELD OF THE INVENTION

The present invention relates to a laminated wave plate and an optical pickup device, in particular, a laminated quarter-wave plate having a required wavelength band broadened by using a high order mode, and an optical pickup device corresponding to a dual wavelength having the laminated quarter-wave plate.

BACKGROUND TECHNOLOGY

CDs or DVDs as optical recording media are widely used because of their cost, compactness, stability and so on. When information recorded in these media is played, or when information is recorded in these media, optical pickup devices are used. A quarter-wave plate is used for optical pickup devices to convert linearly polarized laser light into circularly polarized laser light so as to irradiate it to an optical disc.

The quarter-wave plate is an optical element that modulates a phase by 90 degrees with using birefringence and functions to convert incoming linearly polarized light into circularly polarized light, or convert circularly polarized light into linearly polarized light to be emitted. For example, when a quarter-wave plate is formed using birefringence of quartz crystal, a refractive index of an ordinary ray and a refractive index of an extraordinary ray of quartz crystal are "no" and "ne" respectively, and a thickness of a quartz crystal substrate is "t". A phase difference $\Gamma$ between the ordinary ray and the extraordinary ray when light having a wavelength $\lambda$ transmits through the quarter-wave plate is provided by $\Gamma=2\pi/\lambda \cdot (ne-no) \cdot t$. The phase difference $\Gamma$ depends on the wavelength $\lambda$.

A broadband wave plate whose phase difference is nearly constant in a wavelength band of visible light is disclosed in Patent Document 1. As shown in FIG. 8(a), a quarter-wave plate 40 is composed of a half-wave plate 41, an adhesive 42, and a quarter-wave plate 43. As shown in FIG. 8(b), a stretching axis of the half-wave plate 41 is arranged in a direction of −15 degrees while a stretching axis of the quarter-wave plate 43 is arranged in a direction of −75 degrees against a polarizing direction of linearly polarized light entering into the quarter-wave plate 40. Note that the angles of the stretching axes are stated as angles in which the right side from a y axis on a yz plane is a positive sense. It is disclosed that these half-wave plate 41 and quarter-wave plate 43 are stretched high-molecular-weight films made of polycarbonate, and the quarter-wave plate 40 functions as a nearly perfect quarter-wave plate without depending upon a wavelength in a range of visible light (from 400 nm to 700 nm). Further, a function of the quarter-wave plate 40 is explained with the Poincare sphere.

On the other hand, a quarter-wave plate using a high order mode is disclosed in Patent Document 2. FIG. 9(a) is a plan view of a quarter-wave plate 50 from an incident direction while FIG. 9(b) is a schematic perspective view thereof. It is disclosed that the quarter-wave plate 50 includes a quartz crystal plate 51 having a phase difference of 1695 degrees (a fourth mode 255 degrees) with respect to a wavelength of 785 nm (a wavelength of laser light used for CDs) and an optical axis orientation (an angle made by a polarized direction of linearly polarized light entering into a wave plate and an optical axis) θ1 of 25.5 degrees (An anticlockwise direction is positive here), and a quartz crystal plate 52 having a phase difference of 850 degrees (a second mode 130 degrees) with respect to a wavelength of 785 nm and an optical axis orientation of 79.8 degrees bonded together so that an intersection angle θ3 of each of optical axes 53 and 54 intersected is 54.3 degrees, functioning as a quarter-wave plate in a wavelength band of 655 nm (a wavelength of laser light used for DVDs) and a band of 785 nm as a whole.

A function of the quarter-wave plate 50 is roughly explained using the Poincare sphere. However, detailed analysis is indicated with a following equation using Mueller matrices A1 and A2 respectively for the quartz crystal plates 51 and 52, and Stokes vectors T and S showing respective polarized states of incident and outgoing light.

$$S = A2 \cdot A1 \cdot T \quad (1)$$

A phase difference of the quarter-wave plate 50 can be obtained from a component of the Stokes vector S.

It is disclosed that when a phase difference and an optic axis orientation of each quartz crystal plate with respect to the wavelength of 785 nm are $(\delta 1, \theta 1, \delta 2, \theta 2) = (1695°, 25.5°, 850°, 79.8°)$, and each optical axis is set to be intersected at an angle of 54.3 degrees, a phase difference $\Gamma$ of the laminated quarter-wave plate 50 is a phase difference of 270 degrees at a wavelength of 655 nm and a phase difference of 90 degrees at 785 nm.

Further, as a second embodiment, it is disclosed that a phase difference $\Gamma$ of a quarter-wave plate including a quartz crystal plate having a phase difference of 1980 degrees (a fifth mode 180 degrees) with respect to a wavelength of 655 nm and an optic axis orientation of 14 degrees, and a quartz crystal plate having a phase difference of 990 degrees (a second mode 270 degrees) and an optic axis orientation of 72 degrees bonded together so as to intersect each optical axis at an angle of 58 degrees is a phase difference of 270 degrees at a wavelength of 655 nm and a phase difference of 90 degrees at 785 nm.

[Patent Document 1] Japanese Unexamined Patent Publication No. 10-68816
[Patent Document 2] No. WO2003/091768

DISCLOSURE OF THE INVENTION

Problems to be Solved

Here, in order to facilitate understanding, a general idea about a phase difference is explained. As a method for measuring a phase difference, several methods will be cited. A rotary analyzer method is known as a relatively easy method for measuring a phase difference. The rotary analyzer method is a method to calculate a phase difference by measuring an amount of light after the amount of the light in each direction is taken out from the light emitted from an object of a phase difference measurement by an analyzer. In the present invention, the phase difference was calculated with the same calculation method as the rotary analyzer method to ensure consistency with a measured value of the rotary analyzer method.

Since the rotary analyzer method cannot determine plus and minus signs of Stokes parameter elements S3 due to its principle, not distinguishing between a phase difference in a range of 0 to 180 degrees and a phase difference in a range of 180 to 360 degrees. A notation of the phase difference in a simulation is shown by fitting the phase difference of 180 to 360 degrees into the phase difference of 0 to 180 degrees. According to the result, both phase differences of 90 and 270 degrees are shown as a phase difference of 90 degrees in the simulation. For example, in the second embodiment according to the Patent Document 2 stated above, the Stokes vector S is obtained and a wavelength-phase difference characteristic obtained by the simulation using components thereof is shown in FIG. 10. It is clear that a phase difference of 270 degrees for a wavelength band of 655 nm is shown as a phase difference of 90 degrees.

By the way, a wavelength of laser light emitted from a semiconductor laser diode (hereinafter, referred to as LD) has a drawback in which the wavelength is shifted toward a long wavelength due to a so-called temperature drift when a temperature of the LD itself goes up. In a case where an optical pickup device is composed of two LDs having wavelengths of 655 nm and 785 nm respectively, and a laminated quarter-wave plate in a high order mode having the phase difference characteristic shown in FIG. 10, the wavelength of laser light emitted from the LD having a wavelength of 655 nm is changed toward a long wavelength due to a temperature drift of the LD itself when a temperature of the optical pickup device is changed from a normal temperature (25 degrees centigrade) to a high temperature. However, the phase difference characteristic of the quarter-wave plate shown in FIG. 10 maintains about a phase difference of 90 degrees up to about 675 nm, not causing any problems to conversion of a polarized state of the laser light.

However, as shown in FIG. 10, the phase difference characteristic of the quarter-wave plate has wavelength dependence in which the phase difference starts changing from 790 nm, and then the phase difference changes to 85 degrees at 800 nm. That is, in a case where the quarter-wave plate having such wavelength dependence is used for an optical pickup device, if the wavelength of laser light emitted from an LD is changed toward a long wavelength and becomes 800 nm due to a temperature drift of the LD itself at a wavelength of 785 nm, and when linearly polarized laser light at a wavelength of 800 nm emitted from the LD enters into the quarter-wave plate, the quarter-wave plate functions as a phase difference of 85 degrees and changes the linearly polarized light to a elliptically polarized light. Therefore, laser light of the elliptically polarized light is emitted from the quarter-wave plate, resulting in a problem in which performance of the optical pickup device is decreased.

This invention is to provide a laminated wave plate and an optical pickup device using the laminated wave plate, the laminated wave plate functioning as a quarter-wave plate for laser light with certainty even though a wavelength of the laser light emitted from an LD is changed from a predetermined value due to a temperature drift of the LD.

Means to solve the problem

A laminated wave plate of the present invention includes a first wave plate having a phase difference of $\Gamma 1$ and a second wave plate having a phase difference of $\Gamma 2$ with respect to a wavelength $\lambda$, the first wave plate and the second wave plate being bonded together so that an optical axis of the first wave plate and an optical axis of the second wave plate are intersected each other to function as a quarter-wave plate as a whole, the laminated wave plate comprising following equations from (1) to (6):

$$\Gamma 1 = 360 \times (n1+1) \quad (1);$$

$$\Gamma 2 = 90 \times (2 \times n2 + 1) \quad (2);$$

$$\Delta \Gamma 1 = (\Gamma 12a - \Gamma 11a)/(\lambda 12 - \lambda 11) \quad (3);$$

$$\Delta \Gamma 2 = (\Gamma 12b - \Gamma 11b)/(\lambda 12 - \lambda 11) \quad (4);$$

$$\cos 2\theta 1 = 1 - (1 - \cos \Delta \Gamma 2)/[2 \times (1 - \cos \Delta \Gamma 1)] \quad (5); \text{ and}$$

$$\theta 2 = 45° \pm 5° \quad (6),$$

wherein $\theta 1$ is an optic axis orientation of the first wave plate, $\theta 2$ is an optic axis orientation of the second wave plate, $\Gamma 11a$ is a phase difference of the first wave plate at the wavelength $\lambda 11$, $\Gamma 12a$ is a phase difference of the first wave plate at the wavelength $\lambda 12$, $\Gamma 11b$ is a phase difference of the second wave plate at the wavelength $\lambda 11$, $\Gamma 12b$ is a phase difference of the second wave plate at the wavelength $\lambda 12$, and each of $\lambda 11 \leq \leq \lambda \leq \lambda 12$, n1, and n2 is a natural number starting from 1. According to a structure as above, a bandwidth of a plurality of wavelengths functioning as a quarter-wave plate can be broadened.

Further, the laminated wave plate of the invention was designed to be n1=8, n2=4, $\Delta \Gamma 1$=4.34, and $\Delta \Gamma 2$=1.09. A laminated quarter-wave plate structured as above, a wavelength band of DVDs was successfully broadened by about 14% while a wavelength band of CDs was broadened by about 30%.

Further, the laminated wave plate of the invention was designed to be n1=10, n2=5, $\Delta \Gamma 1$=5.43, and $\Delta \Gamma 2$=1.36. A laminated quarter-wave plate structured as above, linearly polarized light entered to the laminated quarter-wave plate was converted into circularly polarized light and emitted in both of wavelengths for DVDs and CDs.

Further, an optical pickup device of the invention is characterized by including the laminated wave plate of the invention. In the optical pickup device for a dual-wavelength structured as above, the laminated quarter-wave plate can have a band to be a phase difference of 90 degrees broadened significantly in desired wavelengths of 655 nm and 785 nm, and function sufficiently as a quarter-wave plate to laser light even when a wavelength of the laser light emitted from an LD is changed toward a long wavelength due to a temperature drift. Further, even when a severe specification such as a demand of ellipticity of 0.9 or more is required as a quarter-wave plate to be installed in an optical pickup device, the dual wavelength compatible optical pickup device according to the invention can sufficiently satisfy the required specification.

BRIEF DESCRIPTION OF THE DRAWINGS

FIG. 1(a) is a plan view showing a structure of a laminated quarter-wave plate according to the present invention while

FIG. 3(b) is a diagram showing a wavelength dependence characteristic of ellipticity while

FIG. 5(a) is a block diagram showing a structure of an optical pickup device of a first embodiment of the invention and FIG. 5(b) is a block diagram showing a structure of an optical pickup device of a second embodiment of the invention while

FIG. 7(a) is a diagram showing a wavelength-phase difference characteristic of a laminated quarter-wave plate while

REFERENCE NUMERALS

1 . . . high order mode quarter-wave plate, 2,3 . . . wave plate, 4,5 . . . optical axis, 10,25 . . . optical pickup device, 11,13 . . . LD, 12 . . . wavelength separation element, 14 . . . half-wave plate, 15 . . . mirror, 16 . . . front monitor, 17 . . . collimator lens, 18 . . . laminated quarter-wave plate, 21 . . . condenser lens, 22 . . . light detecting element

DESCRIPTION OF PREFERRED EMBODIMENT

Hereinafter, embodiments of the present invention will be described in details with reference to the drawings.

First, how the inventor accomplished the invention is explained below.

The inventor keenly examined a structure to convert linearly polarized light into circularly polarized light for a quarter-wave plate used for optical devices such as an optical pickup device in a plurality of wavelength bands such as CDs (785 nm), DVDs (655 nm), or Blue Laser (405 nm) such as Blu-ray and HDDVD. Then he/she suggested a structure functioning as a broadband quarter-wave plate in a desired range of a wavelength. In the structure, a first wave plate having a phase difference of $\Gamma 1 = 360°$ is laminated with a second wave plate having a phase difference of $\Gamma 2 = 90°$ so that respective axes are intersected at a predetermined angle. Such structure was stated in PCT/JP2006/319926. This is characterized in designing the first wave plate to have the phase difference of 360 degrees and the second wave plate to have a desired phase difference so that the laminated wave plate has a desired phase difference in a broadband, for example, a quarter-wave plate having a phase difference of 90 degrees.

Figure 6:
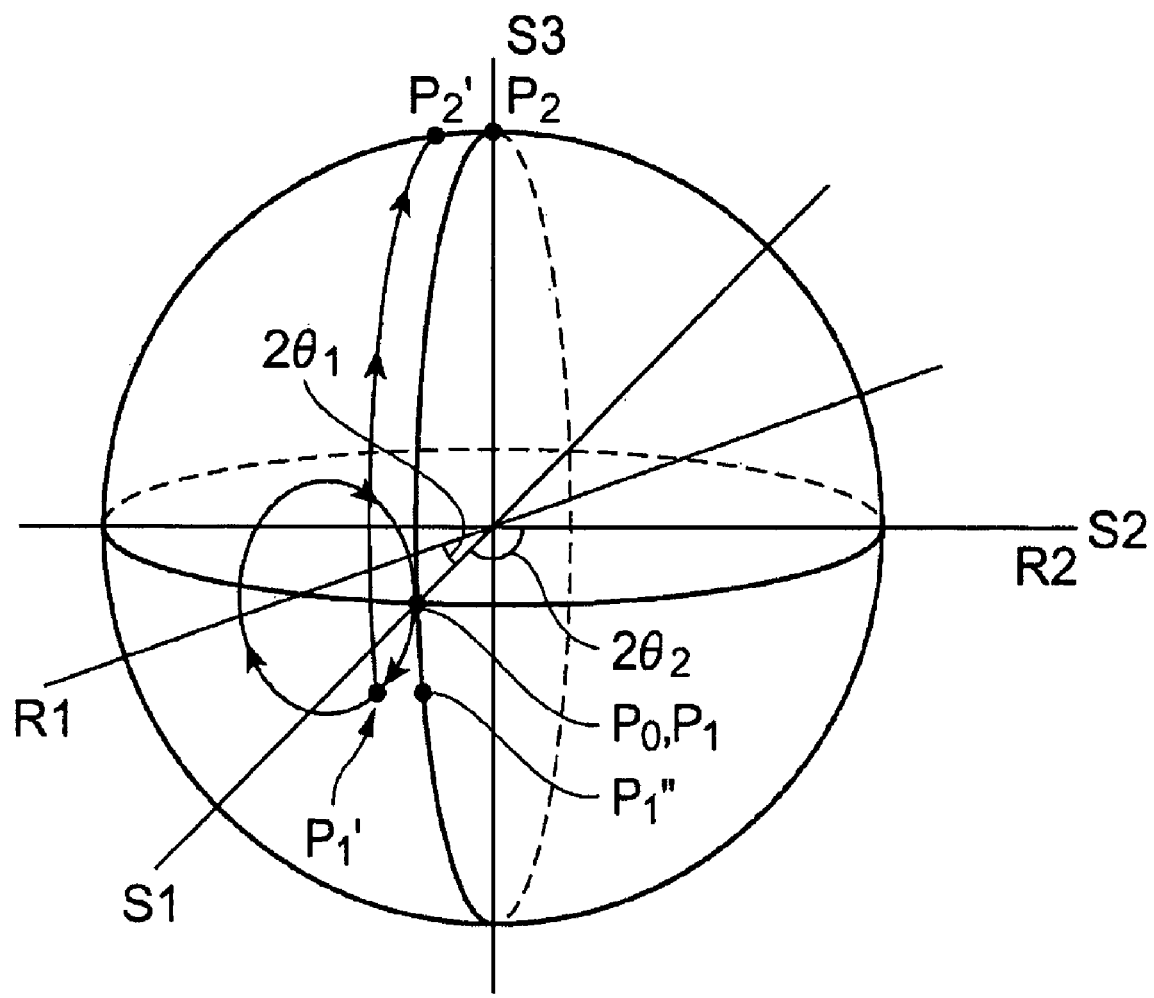
FIG. 6 is a perspective view showing a Poincare sphere to explain an optical characteristic of a laminated wave plate having a compensation function.

An optical change of a polarized state of linearly polarized light entering into the broad band quarter-wave plate stated above is explained with a Poincare sphere shown in FIG. 6. After the linearly polarized light coming in from a point P0 rotates 360 degrees around an optical axis R1 of the first wave plate and reaches a position of a point P1 (the point P0), it further rotates 90 degrees around an optical axis R2 of the second wave plate and reaches a point P2. Since the point P2 is situated at North Pole of the Poincare sphere, the linearly polarized light entered into the broadband quarter-wave plate becomes clockwise circularly polarized light and is emitted from the broadband quarter-wave plate.

Here, because the wavelength of the incident light entered into the broadband quarter-wave plate is changed, a phase difference $\Gamma 1$ of the first wave plate has a phase change of $\Delta \Gamma 1$. If a phase difference $\Gamma 2$ of the second wave plate has a phase change of $\Delta \Gamma 2$, an angle of the optical axis R1 is set to cancel out $\Delta \Gamma 1$ and $\Delta \Gamma 2$ each other, accomplishing a quarter-wave plate that can compensate a phase difference in a broadband.

Next, when the broadband quarter-wave plate is mounted on an optical pickup device provided with an LD emitting divergent laser light, laser light emitted from the LD may enter obliquely to an incident plane of the broadband quarter-wave plate depending on a layout of the optical pickup device. In this case, if incident angle dependence of the broadband quarter-wave plate is small, a phase difference change $\Delta \Gamma = (\Gamma a - \Gamma b)$ between a phase difference $\Gamma a$ of light entering perpendicularly to the incident plane of the broadband quarter-wave plate and a phase difference $\Gamma b$ of light entering obliquely to the incident plane of the broadband quarter-wave plate becomes small. Therefore, even when linearly polarized laser light enters obliquely to the broadband quarter-wave plate, the broadband quarter-wave plate functions as a quarter-wave plate having about a phase difference of 90 degrees. The linearly polarized light obliquely entered to the broadband quarter-wave plate is thus converted to circularly polarized laser light and emitted out from the broadband quarter-wave plate.

Here, in order to reduce the incident angle dependence while single crystal such as quartz crystal is used as a material of the first wave plate and the second wave plate composing the broadband quarter-wave plate, a cutting angle of the quartz crystal can be an angle that an optical axis of the quartz crystal is parallel to an incident plane and an outgoing plane of the wave plate, that is, an angle in which the optical axis is perpendicular to a normal line of the incident plane and the outgoing plane of the wave plate (hereinafter, referred to as 90° Z).

However, to realize a cutting angle 90° Z with a quartz crystal wave plate having a phase difference of 90 degrees with respect to a wavelength 655 nm, a problem in which a thickness of the quartz crystal wave plate becomes an ultra thin plate that is about 18 μm thick arises. Here, considering a yield rate and productivity for manufacturing quartz crystal wave plates, a thickness of about 50 μm to 1 mm is necessary as a thickness of a general quartz crystal wave plate, and a quartz crystal wave plate having the thickness in such a range can be processed with low cost to provide. Accordingly, when the quartz crystal wave plate is polished to make the thickness about 18 μm, processing cost becomes high, making it difficult to provide a low-cost laminated quarter-wave plate.

Therefore, the inventor took into account the problem stated above and investigated a quarter-wave plate made by laminating a first wave plate and a second wave plate that had small incident angle dependence of wave plates and were set in a thickness to be processed easily.

In order to thicken a thickness of a quartz crystal wave plate with a cutting angle 90° Z, making a phase difference of the quartz crystal wave plate large to be a so-called a high order mode wave plate enables the thickness of the quartz crystal wave plate to be thick. That is, in the quarter-wave plate made of the first wave plate with the phase difference $\Gamma 1 = 360°$ and the second wave plate with the phase difference $\Gamma 2 = 90°$ laminated, a case where the thickness of the first wave plate and the second wave plate were made thick was examined.

Here, simply making the thickness of the wave plate thicker cannot achieve a relation in which a phase difference change $\Delta \Gamma a$ of the first wave plate and $\Delta \Gamma b$ of the second wave plate are cancelled out each other. Therefore, a phase difference of the wave plate was made larger, and a structure that could cancel out the phase difference change ΔΓa of the first wave plate and ΔΓb of the second wave plate was examined.

Figure 1A:
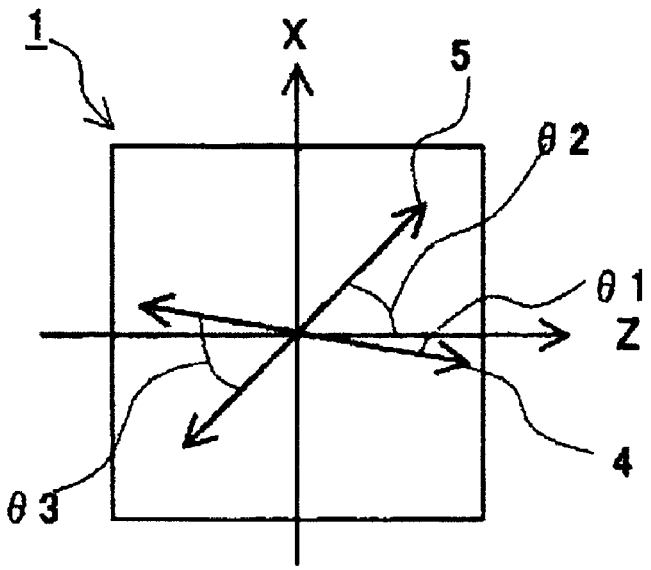
Figure 1B:
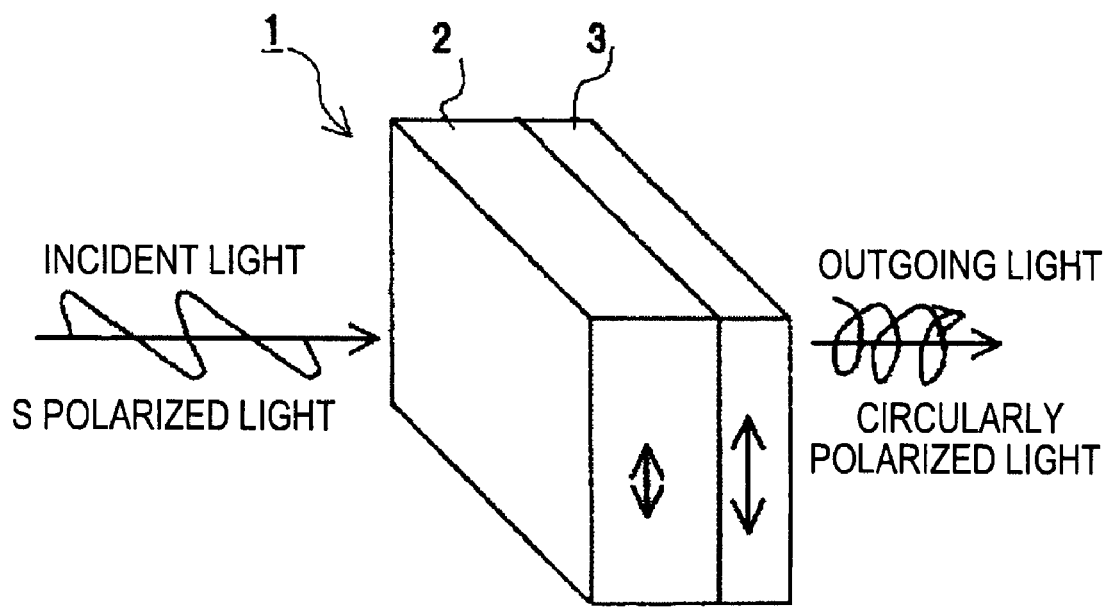
FIG. 1(b) is a perspective view.
Figure 1C:
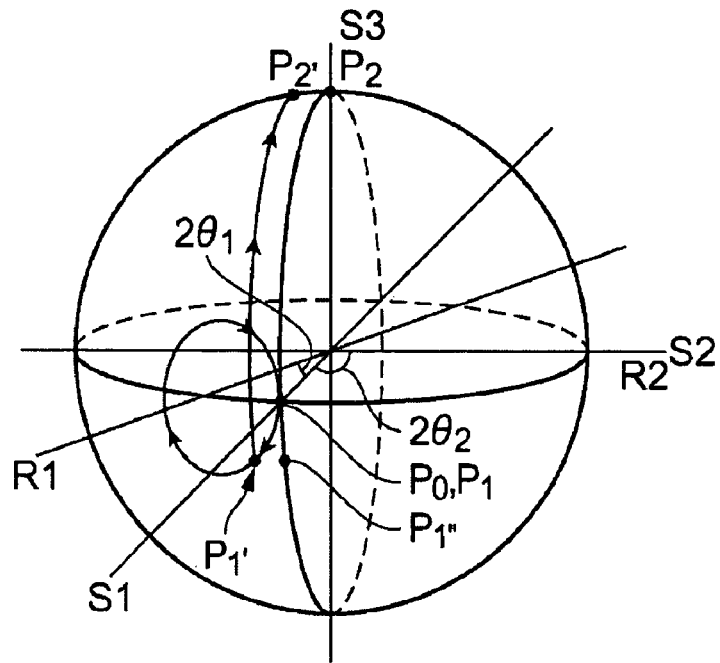
FIGS. 1(c) and 1(d) are perspective views showing Poincare spheres to explain the invention.
Figure 1D:
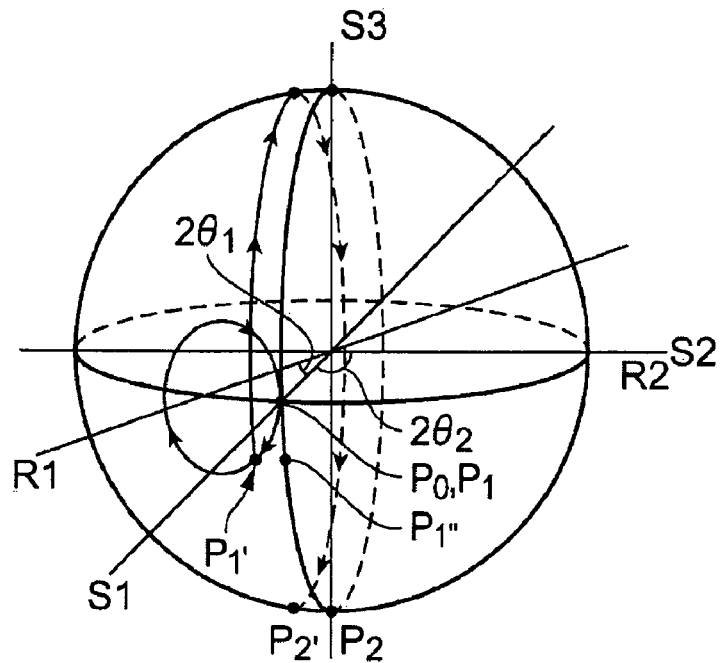

As shown in FIGS. 1(c) and 1(d), in order to convert the linearly polarized light entered from the point P0 by the first wave plate from the point P0 to the point P1, a phase difference Γ1 of the first wave plate can be a multiple of 360 deg. Further, in order to convert the linearly polarized light reached at the point P1 to circularly polarized light by the second wave plate, the point P2 converted from the point P1 can reach North Pole (FIG. 1(c)) or South Pole (FIG. 1(d)) of the Poincare sphere. Therefore, the phase difference Γ2 can be a value of 90°(=90°×1), 270°(=90°×3), 450°(=90°×5), 630°(=90°×7) and so on. In addition, if the phase difference of the second wave plate is made to be 90 degrees, the thickness of the second wave plate at that time becomes an ultra thin plate having about 18 μm thickness as stated above and difficult to be processed. Therefore, it is omitted from the structure. Further, since the phase difference Γ1 of the first wave plate that is combined with the second wave plate having a phase difference Γ2=90° becomes 360 degrees, the first wave plate having the phase difference Γ1=360° is also omitted from the structure.

Accordingly, in a design wavelength λ, the phase difference Γ1 of the first wave plate and the phase difference Γ2 of the second wave plate are represented as below.

$$\Gamma1=360°\times(n1+1) \tag{2}$$

$$\Gamma2=90°\times(2\times n2+1) \tag{3}$$

Note that each of orders n1 and n2 is a natural number starting from 1.

Figure 2A:
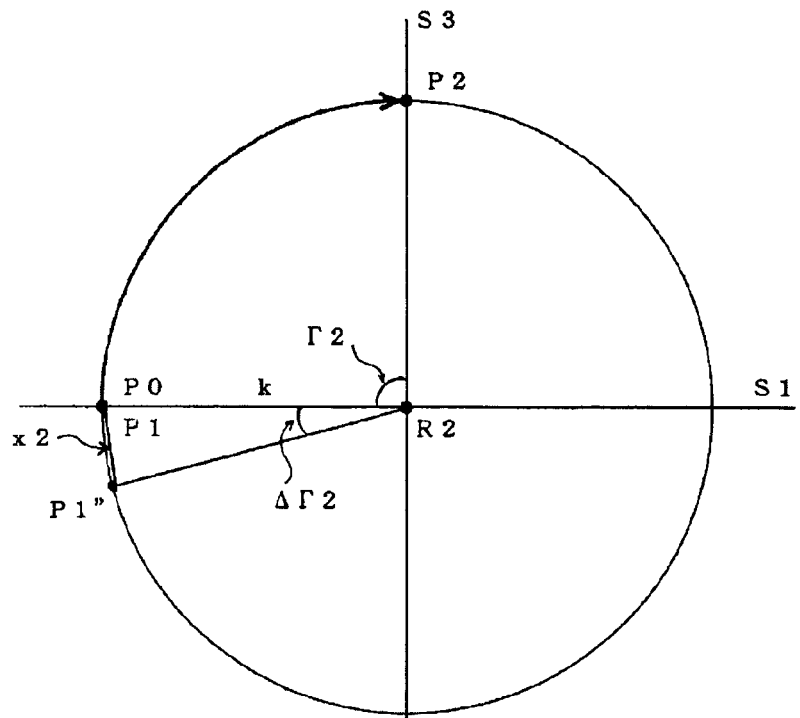
FIGS. 2(a) and 2(b) are plan views showing Poincare spheres to explain the invention.
Figure 2B:
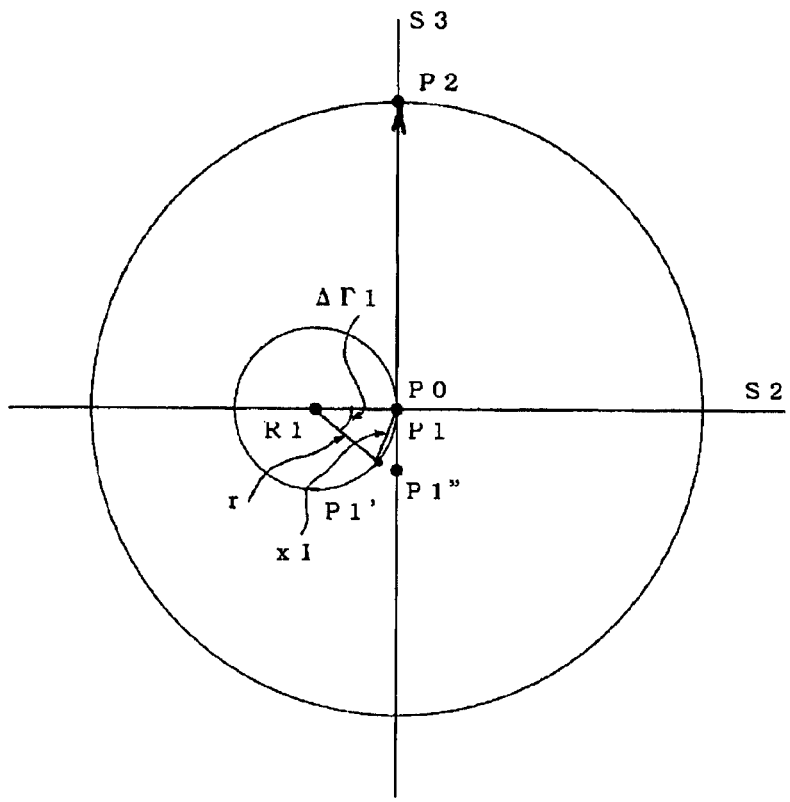

FIG. 2(a) is a diagram to explain a function of a second wave plate 3 composing a laminated wave plate 1 according to the invention, illustrating a view of a trajectory of a polarized state of a light beam entered to the laminated wave plate 1 seen from a direction of an S2 axis (a diagram projected to an S1S3 plane) on the Poincare sphere shown in FIG. 1(c). FIG. 2(b) is a diagram to explain a function of the first wave plate 2 composing the laminated wave plate according to the invention, illustrating a view of a trajectory of the polarized state seen from a direction of an S1 axis (a diagram projected to an S2S3 plane). As shown in FIGS. 2(a) and 2(b), if a light beam of linearly polarized light enters the predetermined position P0 on the equator of the Poincare sphere, it rotates a multiple of 360 degrees only around the optical axis R1 by the first wave plate 2 and reaches the P1 (P0=P1). Further, it rotates by 90 degrees (a multiple of +360 degrees) only around the optical axis R2 by the second wave plate 3 and reaches P2 (North Pole), being emitted as a light beam of circularly polarized light from the laminated wave plate 1.

When the phase difference Γ2 of the second wave plate 3 is changed to the phase change ΔΓ2 due to a change of a wavelength of the incident light, the phase change ΔΓ2 can be cancelled out with the phase change ΔΓ1 in the wavelength of the first wave plate 2, so that wavelength dependence of the laminated wave plate 1 can be suppressed and functioning as a quarter-wave plate in a plurality of wavelength is possible. Further, the phase change of ΔΓ2 due to the wavelength of the second wave plate 3 has a constant value that is defined by a chromatic dispersion of a material of a substrate. Therefore, the size of the phase change of ΔΓ1 depending on the wavelength of the first wave plate 2 is variable by adjusting an in-plane azimuth θ1 of the first wave plate 2.

Consequently, a relational expression of the first wave plate 2 and the second wave plate 3 is derived below.

When a wavelength of incident light is changed between λ11 and λ12 (λ11≦λ≦λ12) from a reference wavelength (design wavelength) λ, phase differences of the first wave plate 2 and the second wave plate 3 are respectively changed from Γ1 and Γ2 due to wavelength dependence of the wave plate.

At this time, in the phase differences of the first wave plate 2 and the phase differences of the second wave plate 3, the phase change ΔΓ1 by the wavelength of the first wave plate 2 and the phase change ΔΓ2 by the wavelength of the second wave plate 3 satisfy equations below.

$$\Delta\Gamma1=(\Gamma12a-\Gamma11a)/(\lambda12-\lambda11) \tag{4}$$

$$\Delta\Gamma2=(\Gamma12b-\Gamma11b)/(\lambda12-\lambda11) \tag{5}$$

Γ11a is defined as a phase difference at a wavelength λ11 while Γ12a is defined as a phase difference at a wavelength λ12, and Γ11b is defined as a phase difference at the wavelength λ11 while Γ12b is defined as a phase difference at the wavelength λ12.

Here, Γ11a, Γ12a, Γ11b, and Γ12b are represented as follows.

$$\Gamma11a=2\pi/\lambda11\times(ne-no)\times t1 \tag{6}$$

$$\Gamma12a=2\pi/\lambda12\times(ne-no)\times t1 \tag{7}$$

$$\Gamma11b=2\pi/\lambda11\times(ne-no)\times t2 \tag{8}$$

$$\Gamma12b=2\pi/\lambda12\times(ne-no)\times t2 \tag{9}$$

Here, t1 is a board thickness of the first wave plate 2, t2 is a board thickness of the second wave plate 3, ne is an extraordinary ray of quartz crystal having a cutting angle of 90°Z, and no is an ordinary ray.

In FIG. 2(a), the coordinate P0 (P1) on the Poincare sphere is changed into P1″ by the phase change of ΔΓ2 occurring to the second wave plate 3. If the distance from P0 to P1″ is approximately represented by a linear line x2, ΔΓ2 and x2 satisfy a relation of an equation (10) below.

$$x2^2=2k^2-2k^2\cos\Delta\Gamma2 \tag{10}$$

Note that k indicates a radius of the Poincare sphere.

Next, similarly, in FIG. 2(b), the coordinate P0 (P1) on the Poincare sphere is changed into P1′ by the phase change ΔΓ1 occurring in the first wave plate 2. If the distance from P0 to P1′ is approximately represented by a linear line x1, ΔΓ1 and x1 satisfy a relation of an equation (11) below.

$$x1^2=2r^2-2r^2\cos\Delta\Gamma1 \tag{11}$$

Note that r is a radius when r is rotated by ΔΓ1 with R1 as a rotation axis.

In addition, r can be shown by an equation (12) below using the in-plane azimuth θ1 of the first wave plate 2.

$$r^2=2k^2-2k^2\cos2\theta1 \tag{12}$$

Further, an equation (13) is obtained when the equation (12) is substituted for the equation (11).

$$x1^2=4k^2(1-\cos2\theta1)(1-\cos\Delta\Gamma1) \tag{13}$$

In order to cancel out the phase change of the first wave plate 2 and the phase change of the second wave plate 3 each other, x1 needs to be nearly equal to x2. According to the equations (10) and (13), the following relation is established.

$$x1^2=x2^2$$

$$2k^2-2k^2\cos\Delta\Gamma2=4k^2(1-\cos2\theta1)(1-\cos\Delta\Gamma1)$$

Further, by normalizing k, an equation (14) is obtained.

$$\cos2\theta1=1-(1-\cos\Delta\Gamma2)/\{2\times(1-\cos\Delta\Gamma1)\} \tag{14}$$

Accordingly, the optic axis orientation (in-plane azimuth) θ1 of the first wave plate 2 can be calculated when the equations (4) and (5) are substituted for the equation (14). At this time, as for an optic axis orientation θ2 of the second wave plate 3, setting θ2 around 45 degrees is optimum considering that the point P1 is converted to the point P2 on the Poincare sphere.

Based on the design concept above, the phase difference Γ1 and the optic axis orientation θ1 of the first wave plate 2, and the phase difference Γ2 and the optic axis orientation θ2 of the second wave plate 3 composing the laminated quarter-wave plate 1 can be calculated.

Next, a specific calculation method for Γ1, Γ2, θ1, and θ2 is explained. When a material is quartz crystal having a cutting angle 90° Z and a design wavelength is 655 nm, the phase difference change amount ΔΓ1 of first wave plate 2, the phase difference change amount ΔΓ2 of the second wave plate 3, and the board thickness t1 of the first wave plate 2 and the board thickness t2 of the second wave plate 3 are calculated in a wavelength range from 600 nm to 850 nm.

In the first wave plate 2, Γ1, ΔΓ1, and t1 may have values shown in Table 1 below.

TABLE 1

| First Wave Plate 2 | | |
|---|---|---|
| Γ1(deg) | ΔΓ1(deg/nm) | t1(μm) |
| 720 | 1.13 | 145 |
| 1080 | 1.54 | 218 |
| 1440 | 2.26 | 290 |
| 1800 | 2.28 | 363 |
| 2160 | 3.39 | 436 |
| ... | ... | ... |

In the second wave plate 3, Γ2, ΔΓ2, and t2 may have values shown in Table 2 below.

TABLE 2

| Second Wave Plate 3 | | |
|---|---|---|
| Γ2(deg) | ΔΓ2(deg/nm) | t2(μm) |
| 270 | 0.29 | 54 |
| 450 | 0.7 | 91 |
| 630 | 0.99 | 127 |
| 810 | 1.27 | 163 |
| 990 | 1.55 | 200 |
| ... | ... | ... |

According to Table 1 and Table 2, for example, when Γ1=1080 deg and Γ2=270 deg are set, θ1 calculated by assigning ΔΓ1=1.54 and ΔΓ2=0.29 to the equation (14) is about 5.5°. Further, since θ2 is 45°, design conditions approximately obtained are as follows:

Γ1=1080 deg;
Γ2=270 deg;
θ1=5.5°; and
θ2=45°.

Since these design conditions include approximations, it is preferable to optimize them by performing further detailed calculations. The detailed calculations can be performed by using Jones matrix or Mueller matrix. A calculation using Mueller matrix was performed here.

First, the calculation method will be described in brief. A polarized state after linearly polarized light transmitted through two wave plate can be represented by Mueller matrix.

$$E = R_2 \cdot R_1 \cdot I \quad (15)$$

Here, I is a vector indicating a polarized state of incident light while E is a vector indicating a polarized state of outgoing light. $R_1$ is a Mueller matrix for the first wave plate 2 of the laminated quarter-wave plate 1 and $R_2$ is a Mueller matrix for the second wave plate 3, being respectively represented by equations below.

[Equation 1]

$$R_1 = \begin{bmatrix} 1 & 0 & 0 & 0 \\ 0 & 1-(1-\cos\Gamma_1)\sin^2 2\theta_1 & (1-\cos\Gamma_1)\sin 2\theta_1 \cos 2\theta_1 & -\sin\Gamma_1 \sin 2\theta_1 \\ 0 & (1-\cos\Gamma_1)\sin 2\theta_1 \cos 2\theta_1 & 1-(1-\cos\Gamma_1)\sin^2 2\theta_1 & \sin\Gamma_1 \cos 2\theta_1 \\ 0 & \sin\Gamma_1 \sin 2\theta_1 & -\sin\Gamma_1 \cos 2\theta_1 & \cos\Gamma_1 \end{bmatrix} \quad (17)$$

[Equation 2]

$$R_2 = \begin{bmatrix} 1 & 0 & 0 & 0 \\ 0 & 1-(1-\cos\Gamma_2)\sin^2 2\theta_2 & (1-\cos\Gamma_2)\sin 2\theta_2 \cos 2\theta_2 & -\sin\Gamma_2 \sin 2\theta_2 \\ 0 & (1-\cos\Gamma_2)\sin 2\theta_2 \cos 2\theta_2 & 1-(1-\cos\Gamma_2)\cos^2 2\theta_2 & \sin\Gamma_2 \cos 2\theta_2 \\ 0 & \sin\Gamma_2 \sin 2\theta_2 & -\sin\Gamma_2 \sin 2\theta_2 & \cos\Gamma_2 \end{bmatrix} \quad (16)$$

By determining the high mode orders n1 and n2 of the first wave plate 2 and the second wave plate 3, and setting the respective phase differences Γ1 and Γ2, and the optic axis orientations θ1 and θ2, the Muller matrices $R_1$ and $R_2$ are evaluated with the equations (16) and (17). Then, when the incident light polarized state I is set, the outgoing light polarized state E is calculated with the equation (15).

The outgoing light polarized state E is represented by the following equation.

[Equation 3]
$$E = \begin{bmatrix} S_{01} \\ S_{11} \\ S_{21} \\ S_{31} \end{bmatrix} \quad (18)$$

Matrix elements of E, $S_{01}$, $S_{11}$, $S_{21}$, $S_{31}$, are called as Stokes parameters and indicate polarized states. By using these stokes parameters, a phase difference Γ is represented by the following equation.

[Equation 4]
$$\Gamma = \tan^{-1} \frac{S_{31}}{\sqrt{S_{11}^2 + S_{21}^2}} \quad (19)$$

Accordingly, a phase difference can be calculated by using the equation (19).

Figure 7A:
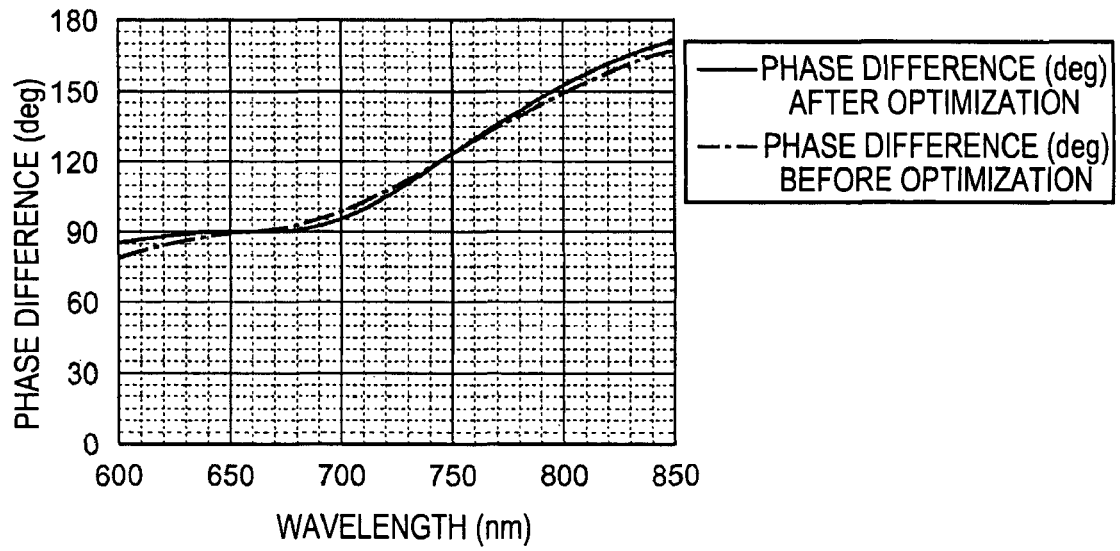
Figure 7B:
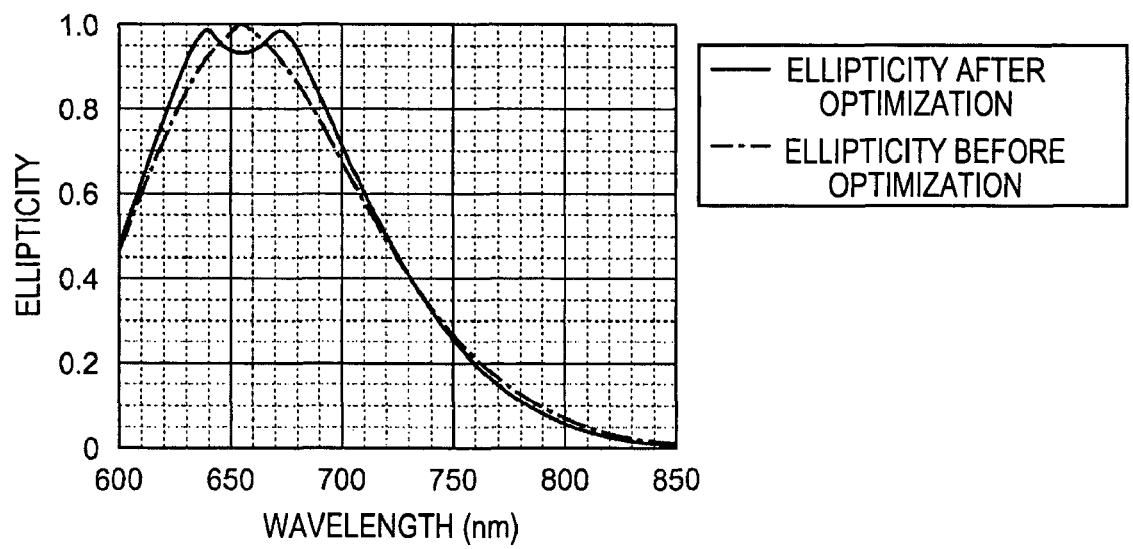
FIG. 7(b) is a diagram showing a wavelength dependence characteristic of ellipticity.
Figure 8A:
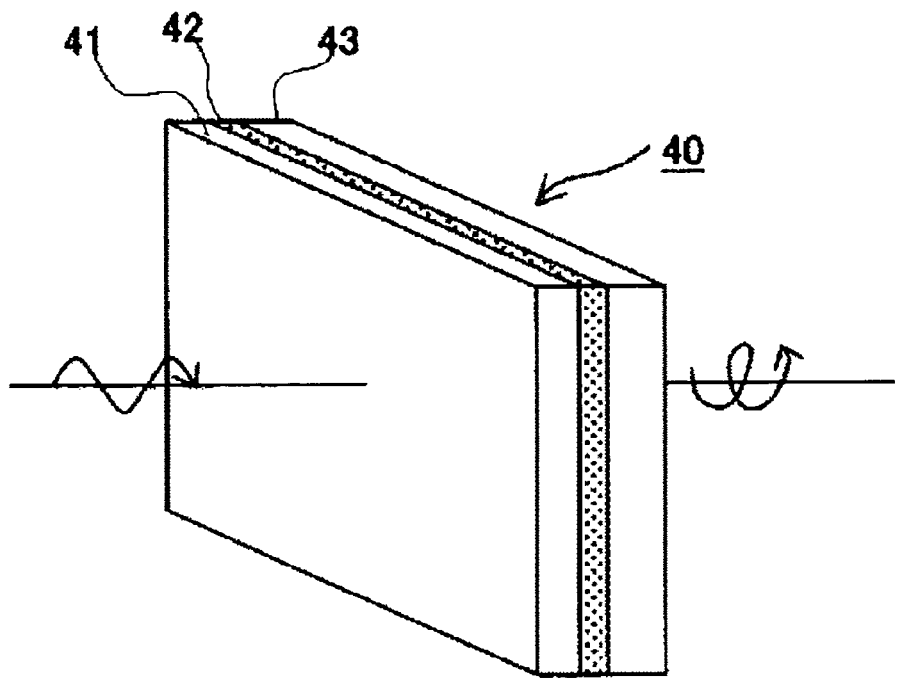
FIGS. 8(a) and 8(b) are diagrams showing a structure of a quarter-wave plate in related art.
Figure 8B:
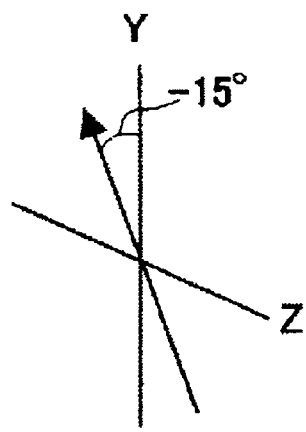
Figure 8B:
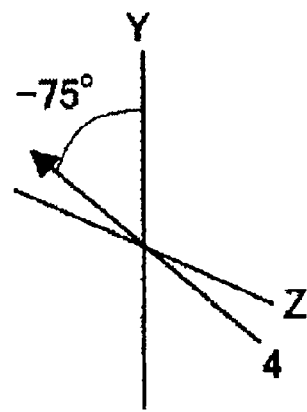
Figure 9A:
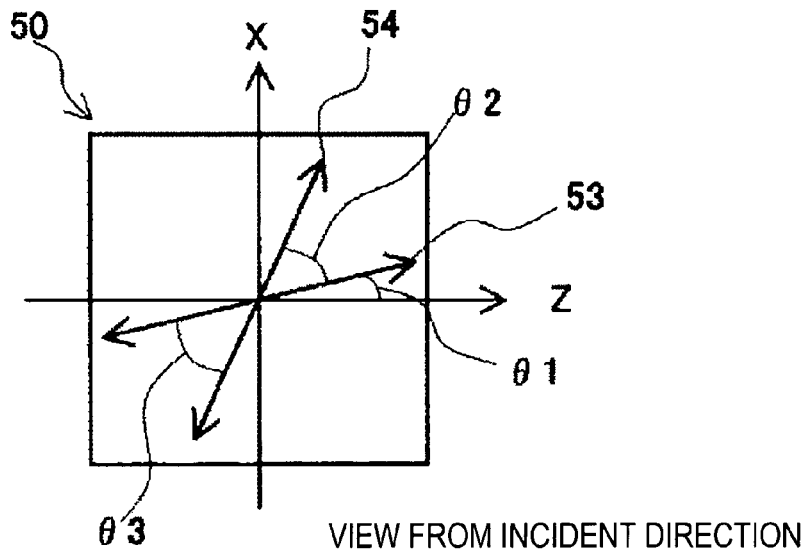
FIGS. 9(a) and 9(b) are diagrams showing a structure of a quarter-wave plate in a high order mode in related art.
Figure 9B:
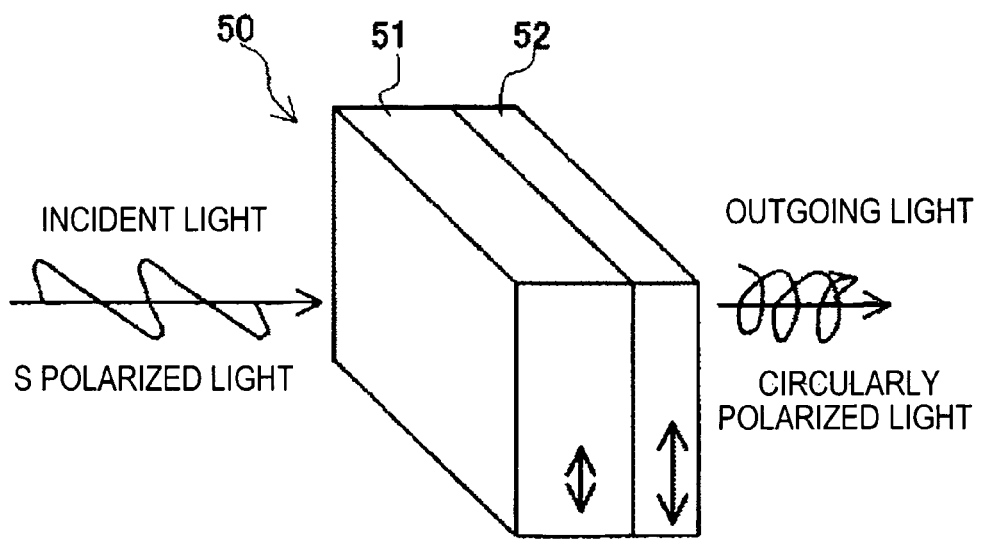

FIG. 7 is a graph showing a result of a simulation performed with design conditions evaluated approximately (a dashed-dotted line) and a result optimizing it (a solid line). In addition, respective design conditions of the first wave plate 2 and the second wave plate 3 are shown in Table 3.

TABLE 3

|  | Approximation conditions | Optimization conditions |
| --- | --- | --- |
| Γ1(deg) | 1080 | 1080 |
| Γ2(deg) | 270 | 270 |
| θ1(deg) | −5.5 | −7.5 |
| θ2(deg) | 45 | 44 |

By adjusting the optic axis orientation θ1 of the first wave plate 2 and the optic axis orientation θ2 of the second wave plate 3, an inclination of the phase difference in a band of around 655 nm is made small and ellipticity is made to be 0.9 or more. With these design conditions, the laminated quarter-wave plate 1 functions as a quarter-wave plate only in a single wavelength band of 655 nm. Therefore, a combination of Γ1 and Γ2 is selected for functioning as a quarter-wave plate in a plurality of wavelength bands, deriving optimum design conditions by using Jones matrix or Mueller matrix as below.

Figure 10:
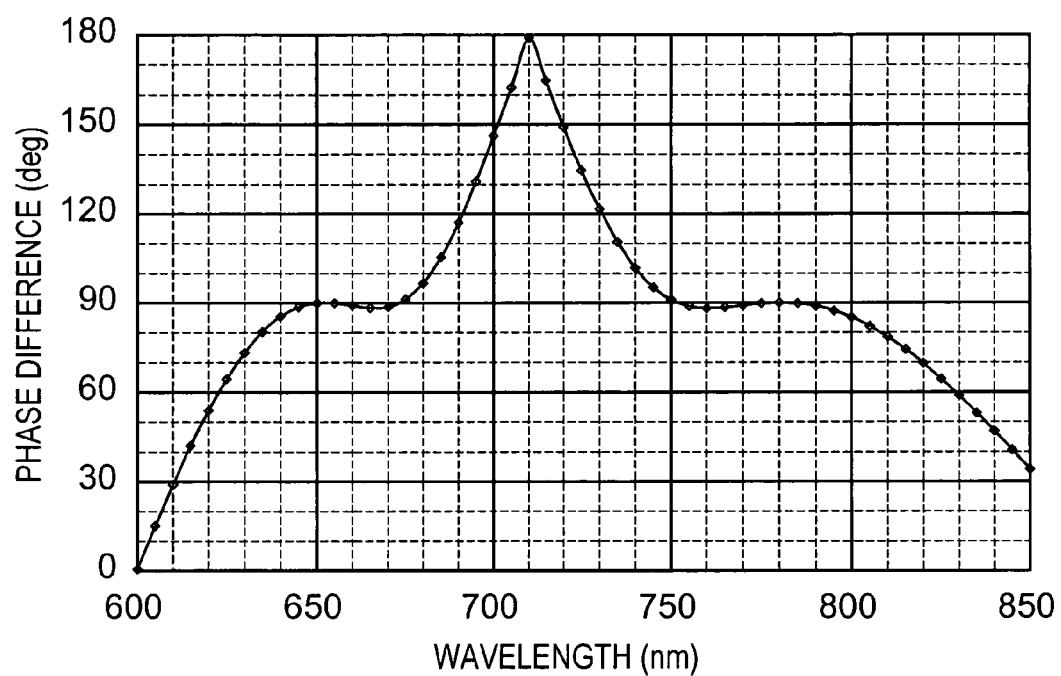
FIG. 10 is a diagram showing a wavelength-phase difference characteristic of a quarter-wave plate in a high order mode in related art.

Based on the design concept stated above, the inventor of this invention simulated various changes of the respective orders n1 and n2 of the first wave plate 2 and the second wave plate 3, the respective phase differences Γ1 and Γ2 in a design wavelength, and the respective optic axis orientations θ1 and θ2, which are parameters of the laminated quarter-wave plate, so as to make the phase difference be 90 degrees in a plurality of desired wavelength bands and make their bandwidths broad. While the bandwidth of 655 nm for DVDs was ensured, a parameter was calculated so that a band of 785 nm for CDs was broader than a wavelength-phase difference characteristic of a common quarter-wave plate shown in FIG. 10 in a wavelength band from 780 nm to 800 nm.

Quartz crystal having a cutting angle 90° Z (An intersection angle of a direction of a normal line on a main surface of a quartz crystal plate and an optical axis (z axis) is 90 degrees.) is respectively used for the first wave plate 2 and the second wave plate 3 composing the laminated quarter-wave plate 1 in FIG. 1. According to the equations (2) and (3), the phase difference Γ1 of the first wave plate 2 and the phase difference Γ2 of the second wave plate 3 are as follows:

Γ1=360°×(8+1)=3240°; and

Γ2=90°×(2×4+1)=810°.

The orders are n1=8, n2=4, and the design wavelength λ is 642 nm. Therefore, ΔΓ1 and ΔΓ2 at this time are as follows:
ΔΓ1=4.34; and
ΔΓ2=1.09.

Accordingly, when the optic axis orientation θ1 of the first wave plate 2 is calculated by assigning ΔΓ1 and ΔΓ2 to the equation (14), the evaluation is:
θ1=−7.2°.

The optic axis orientation θ2 of the second wave plate 3 is:
θ2=45°.

Figure 3A:
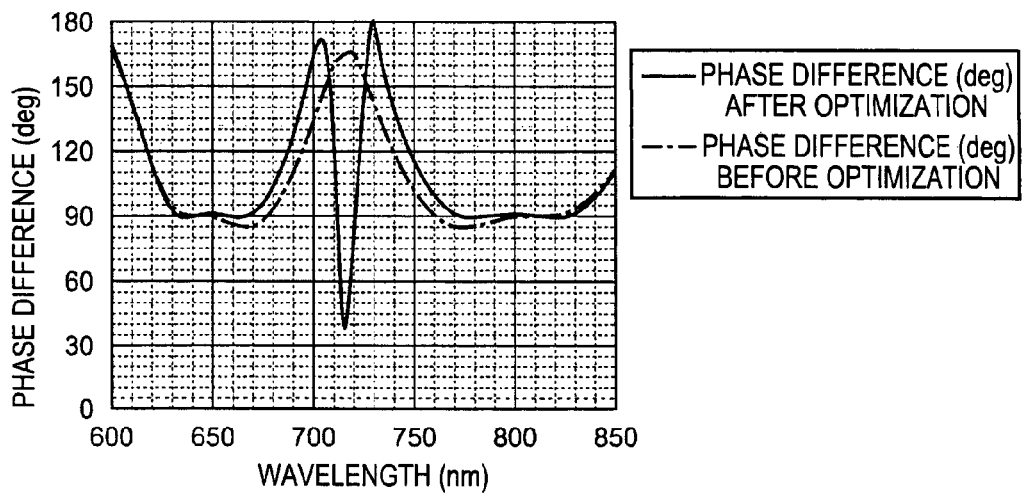
FIG. 3(a) is a diagram showing a wavelength-phase difference characteristic of a laminated quarter-wave plate according to the invention.

Therefore, a simulation was performed using these approximation conditions as design conditions. Further, based on a solution (a phase difference characteristic and so on) obtained from the simulation, the bandwidth was optimized to be broadened. FIG. 3(*a*) is a characteristic graph showing wavelength dependence of the phase difference of the laminated quarter-wave plate 1. The dashed-dotted line shows a characteristic before optimization (approximation conditions) while the solid line is a characteristic after optimization.

In addition, respective design conditions of the first wave plate 2 and the second wave plate 3 after optimization are as follows:
Γ1=3240°;
Γ2=810°;
θ1=−8.5°; and
θ2=44°.

Further, the thickness t1 of the first wave plate 2 and the thickness t2 of the second wave plate 3 at this time are as follows:
t1=639 (μm); and
t2=160 (μm).

In wavelength ranges for DVDs and CDs, as before and after optimization is compared, it is found that a band to be a phase difference 90 degrees after optimization is broader than that before the optimization. When the phase difference characteristic after optimization is compared to the phase difference characteristic in a conventional structure shown in FIG. 10 in a range of a phase difference 90° ±5°, while a wavelength range for DVDs of a conventional example is from 640 nm to 675 nm (bandwidth 35 nm), the invention can broaden the band for from 630 nm to 670 nm (bandwidth 40 nm). Further, while a wavelength range for CDs of the conventional example is from 750 nm to 800 nm (bandwidth 50 nm), the invention can broaden the band for from 765 nm to 830 nm (bandwidth 65 nm).

Further, the graph of a phase difference characteristic shown in FIG. 3(*a*) is expressed based on the rotary analyzer method as stated above. That is, based on the design concept of the invention, the laminated quarter-wave plate 1 is designed so that the phase difference of the second wave plate 3 is to be a high order mode at 90 degrees (=810°−360°×2) when the design wavelength λ is 642 nm in order to function as a quarter-wave plate in a plurality of wavelength bands (here, bands of 655 nm and 785 nm). Therefore, an actual phase difference in the wavelength band of 655 nm for the laminated quarter-wave plate 1 is 810 degrees.

Figure 3B:
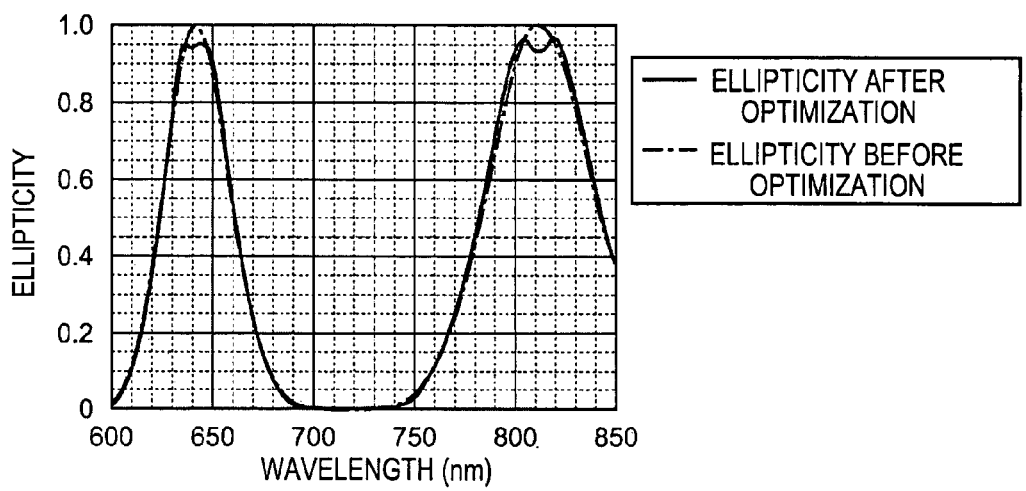
Figure 3C:
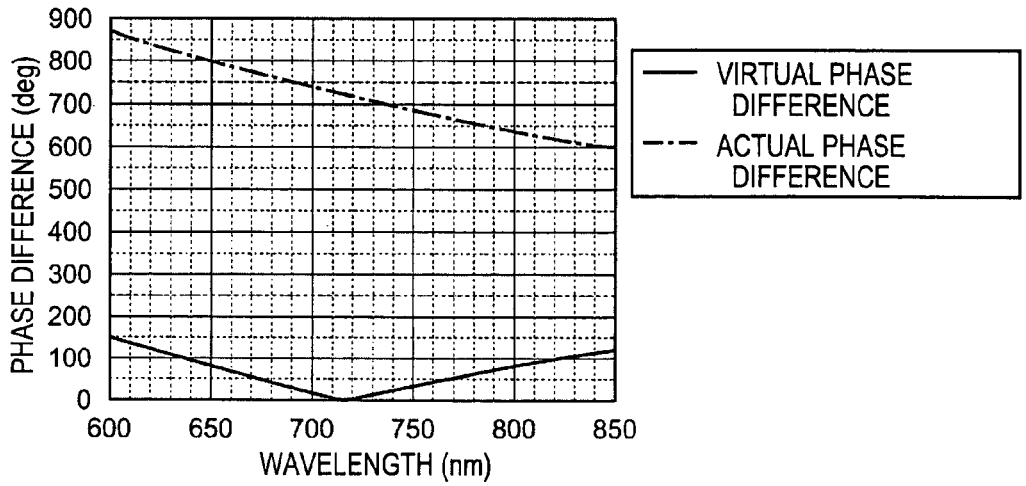
FIG. 3(c) is a diagram showing a wavelength-phase difference characteristic of a second wave plate.

Next, a phase difference of the laminated quarter-wave plate 1 in a wavelength band of 785 nm will be explained. FIG. 3(c) is a characteristic graph showing wavelength dependence of the phase difference of the second wave plate 3. In FIG. 3(c), the dotted line indicates an actual phase difference (a phase difference of a high order mode) of the second wave plate 3 while the solid line indicates a virtual phase difference (a value calculated by subtracting a multiple of 360 degrees from the actual phase difference). As shown in FIG. 3(c), the solid line shows that the second wave plate 3 in the band of 785 nm can function as a quarter-wave plate at a phase difference 90 degrees at 810 nm. The dotted line shows that the actual phase difference at this time is 630 degrees. Therefore, the virtual phase difference at 810 nm is 270 degrees (=630°−360°), in which a multiple of 360 degrees is subtracted from 630 degrees.

Next, the inventor performed an examination on ellipticity of the laminated quarter-wave plate 1. FIG. 3(b) is a characteristic graph showing wavelength dependence of the ellipticity of the laminated quarter-wave plate 1. The dashed-dotted line shows a characteristic before optimization while the solid line shows a characteristic after optimization.

When the ellipticities of the laminated quarter-wave plate 1 after and before optimization are compared, both are nearly equal to each other. However, it is found that a band after optimization is slightly broader at the ellipticity of 7.0 or more.

However, in wavelength ranges for DVDs and CDs, the ellipticity becomes from 0.6 to 0.7. Therefore, it is found that linearly polarized light entered in the laminated quarter-wave plate 1 became elliptically polarized light, not circularly polarized light, and was emitted from the laminated quarter-wave plate 1. If the laminated quarter-wave plate 1 is designed with the orders n1=8 and n2=4, in a case where a quarter-wave plate of an optical pickup device is required to have ellipticity of 0.9, a new issue in which requirement specification cannot be satisfied sufficiently arises.

Therefore, the inventor performed a further simulation of the laminated quarter-wave plate 1 with the orders n1=10 and n2=5, and the design wavelength λ of 655 nm. According to the equations (2) and (3), the phase difference Γ1 of the first wave plate 2 and the phase difference Γ2 of the second wave plate 3 are as follows:

Γ1=360°×(10+1)=3,960°; and

Γ2=90°×(2×5+1)=990°.

Figure 4A:
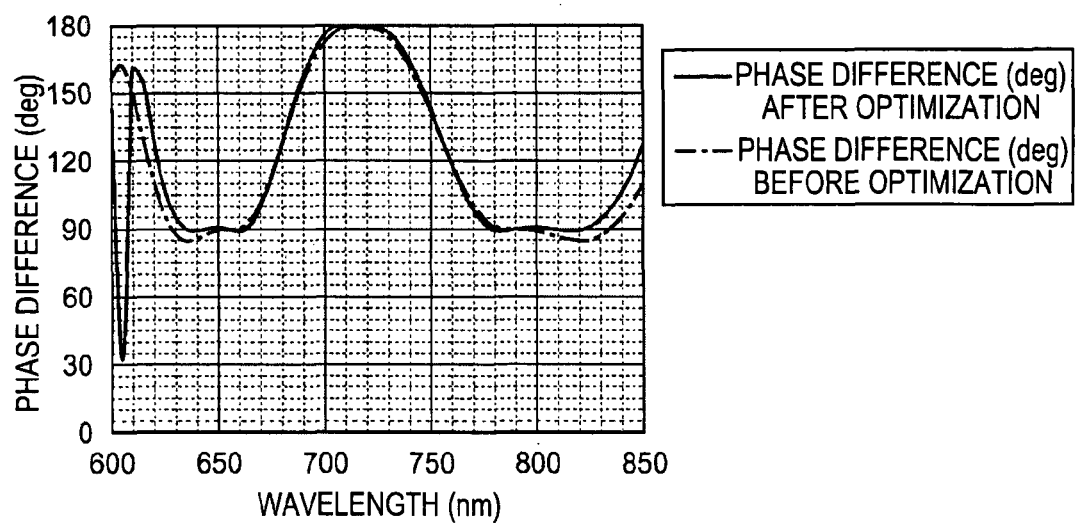
FIG. 4(a) is a diagram showing a wavelength-phase difference characteristic of another laminated quarter-wave plate according to the invention.

The orders are n1=10 and n2=5.
Therefore, ΔΓ1 and ΔΓ2 at this time are respectively as follows:
ΔΓ1=5.43; and
ΔΓ2=1.36.
Accordingly, when the optic axis orientation θ1 of the first wave plate 2 is calculated by assigning ΔΓ1 and ΔΓ2 to the equation (14). The evaluation is:
θ1=−7.2°.
The optic axis orientation θ2 of the second wave plate 3 is:
θ2=45°.
Therefore, a simulation was performed using these approximation conditions as design conditions. Further, based on a solution (a phase difference characteristic and so on) obtained from the simulation, the bandwidth is optimized to be broadened. FIG. 4(a) is a characteristic graph showing wavelength dependence of the phase difference of the laminated quarter-wave plate 1. The dashed-dotted line shows a characteristic before optimization while the solid line shows a characteristic after optimization.

In addition, respective design conditions of the first wave plate 2 and the second wave plate 3 after optimization are as follows:
Γ1=3960°;
Γ2=990°;
θ1=−8.5°; and
θ2=44°.
Further, the thickness t1 of the first wave plate 2 and the thickness t2 of the second wave plate 3 at this time are as follows:
t1=800 (μm); and
t2=200 (μm).

In wavelength ranges for DVDs and CDs, as before and after optimization is compared, it is found that a band to be a phase difference 90 degrees after optimization is broader than that before the optimization. When the phase difference characteristic after optimization is compared to the phase difference characteristic in the conventional structure shown in FIG. 10 in a range of a phase difference 90°0 ±5°, while a wavelength range for DVDs of the conventional example is from 640 nm to 675 nm (bandwidth 35 nm), the invention can broaden the band for from 630 nm to 667 nm (bandwidth 47 nm). Further, while a wavelength range for CDs of the conventional example is from 750 nm to 800 nm (bandwidth 50 nm), the invention can broaden the band for from 772 nm to 832 nm (bandwidth 60 nm).

Figure 4B:
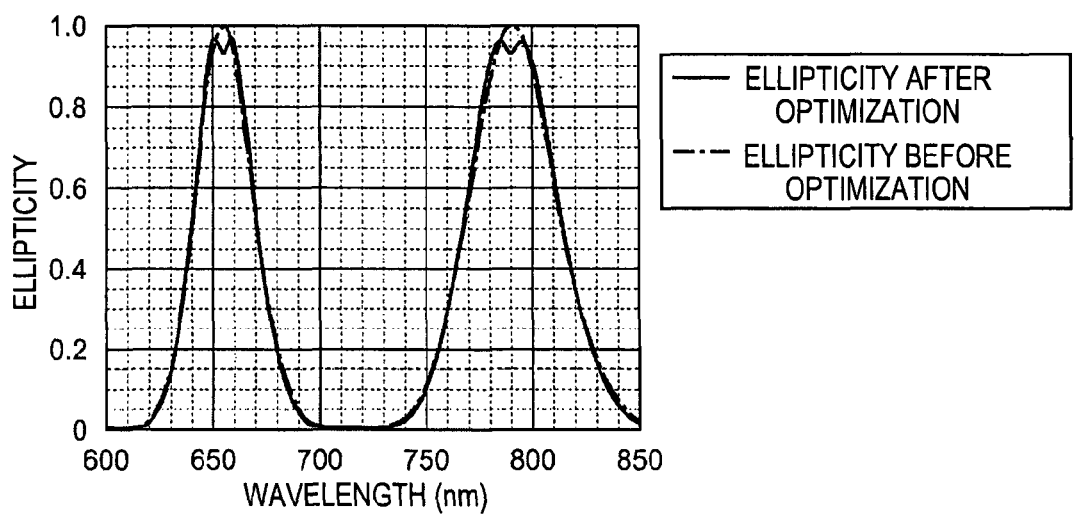
FIG. 4(b) is a diagram showing a wavelength dependence characteristic of ellipticity.

FIG. 4(b) is a characteristic graph showing wavelength dependence of the ellipticity of the laminated quarter-wave plate 1. The dashed-dotted line shows a characteristic before optimization while the solid line shows a characteristic after optimization. As for wavelength dependence of the ellipticity after optimization, ellipticity of 0.9 or more is ensured in a band from 647 nm to 663 nm for DVDs and a band from 780 nm to 802 nm for CDs. Linearly polarized light entered to the laminated quarter-wave plate 1 is converted to nearly circularly polarized light and successfully emitted from the laminated quarter-wave plate 1.

As mentioned above, it is found that the laminated quarter-wave plate according to the invention can have a band to be a phase difference of 90 degrees significantly broadened in desired wavelengths of 655 nm and 785 nm, and functions sufficiently as a quarter-wave plate to laser light even when a wavelength of the laser light emitted from an LD is changed toward a long wavelength due to a temperature drift. Further, to provide a laminated quarter-wave plate that satisfies a severe specification such as a demand of ellipticity of 0.9 or more as a quarter-wave plate to be installed in an optical pickup device becomes possible.

A quartz crystal plate is used as a birefringence plate in the explanation above. However, other crystals such as BBO, calcite, lithium niobate, YVO4 can be used. Further, a birefringence plate using resin or the like can also be used.

Further, an optic axis orientation for quartz can be adequately set in a range of about ±5° from an approximation value based on requirement specifications.

Figure 5A:
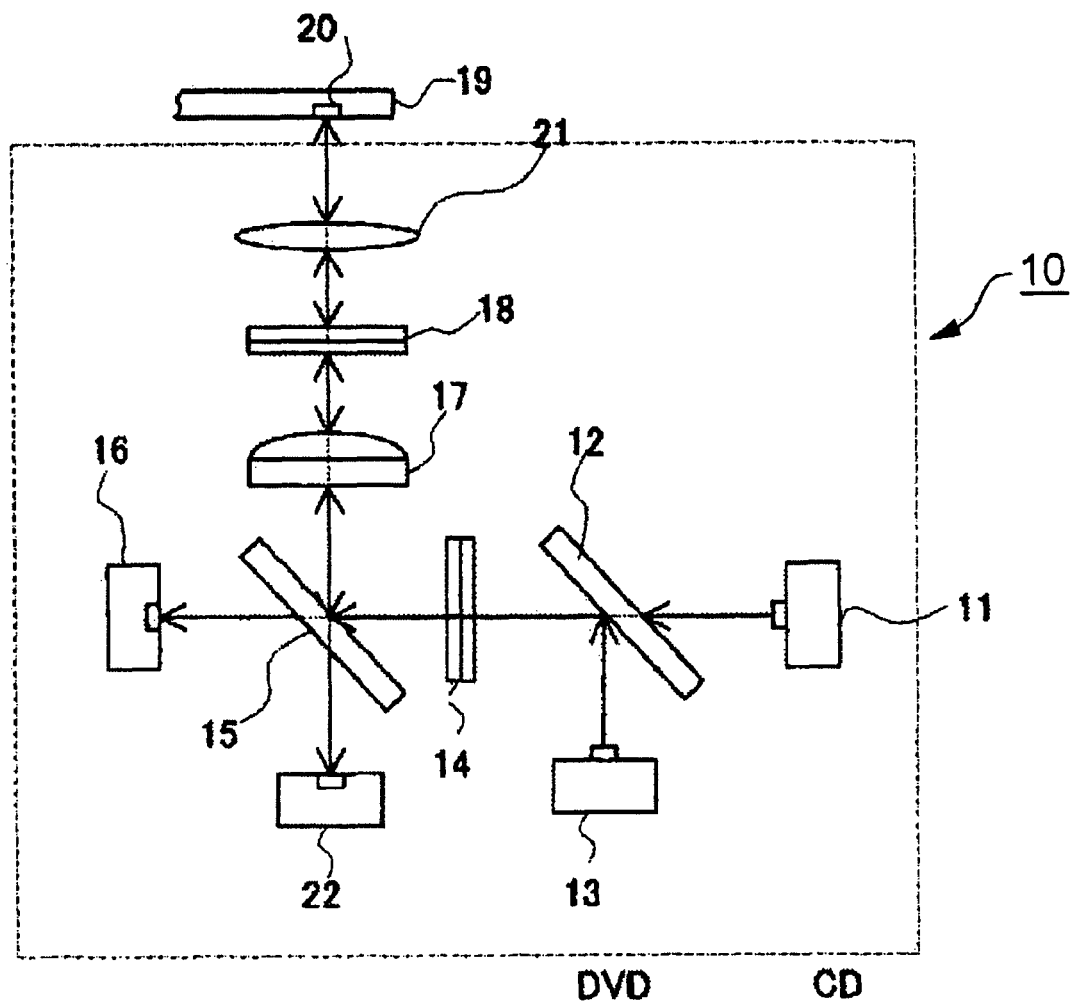

FIG. 5(a) is a block diagram showing a structure of a dual wavelength compatible optical pickup 10 in a first embodiment according to the present invention. The dual wavelength compatible optical pickup 10 is composed of a laser diode (LD) 11 emitting laser light with a wavelength of 785 nm for CDs, an LD 13 emitting linearly polarized laser light with a wavelength of 655 nm for DVDs, a wavelength separation element 12 reflecting the linearly polarized laser light emitted from the LD 13 and transmitting the linearly polarized laser light emitted from the LD 11, a half-wave plate 14 converting a phase of the laser light reflected and transmitted through the wavelength separation element 12 by 180 degrees to be emitted, a mirror 15 reflecting and transmitting the laser light emitted from the half-wave plate 14 at a predetermined ratio, a front monitor (FM) 16 monitoring the laser light transmitted through the mirror 15, a collimator lens 17 collimating the laser light reflected by the mirror 15, a laminated quarter-wave plate 18 according to the invention converting the linearly polarized light transmitting through the collimator lens 17 to circularly polarized light, a condenser lens 21 condensing the laser light to a pit 20 formed on an optical disk 19, and a light detecting element PD22 detecting the laser light reflected by the pit 20 through the condenser lens 21, the laminated quarter-wave plate 18, the collimator lens 17, and the mirror 15.

In the dual wavelength compatible optical pickup device according to the invention, the laminated quarter-wave plate used in the dual wavelength compatible optical pickup device has a wavelength band functioning as a phase difference of 90 degrees broadened, resulting in effects to function sufficiently as a quarter-wave plate to laser light and improve performance of the dual wavelength compatible optical pickup device even when a wavelength of the laser light emitted from an LD is changed toward a long wavelength due to a temperature drift.

Figure 5B:
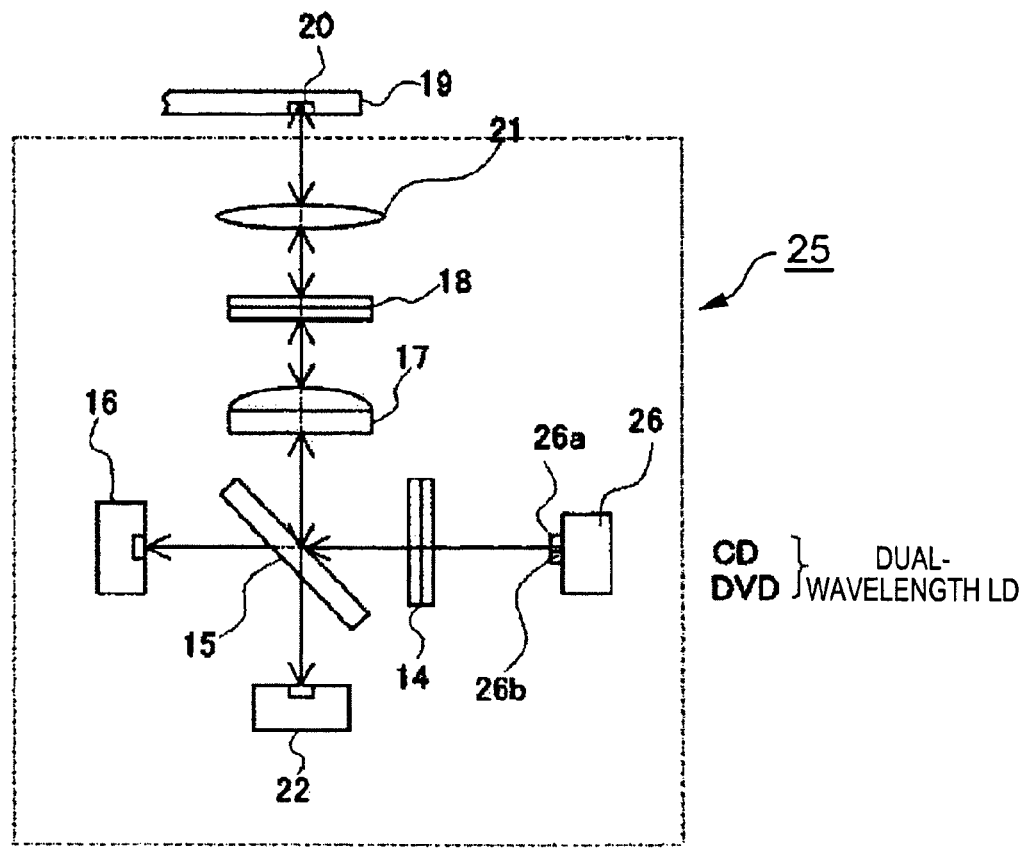

Further, by using a dual wavelength laser diode recently developed and the laminated quarter-wave plate of the invention, a new dual wavelength compatible optical pickup device can be formed. The same numerals in FIG. 5(a) are used for the same optical elements. FIG. 5(b) is a block diagram of a dual wavelength compatible optical pickup 25 for a in a second embodiment according to the present invention. The dual wavelength compatible optical pickup 25 is composed of an integrated LD 26 having LDs 26a and 26b emitting linearly polarized laser light with wavelengths of 785 nm and 655 nm respectively corresponding to CDs and DVDs, the half-wave plate 14 converting a phase of either one of the laser light having 785 nm and 660 nm emitted from the integrated LD 26 by 180 degrees to be emitted, the mirror 15 reflecting and transmitting the laser light emitted from the half-wave plate 14 at a predetermined ratio, the front monitor (FM) 16 monitoring the laser light transmitting through the mirror 15, the collimator lens 17 collimating the laser light reflected by the mirror 15, the laminated quarter-wave plate 18 according to the invention converting the linearly polarized light transmitting through the collimator lens 17 to circularly polarized light, a condenser lens 21 condensing laser light to the pit 20 formed on the optical disk 19, and the light detecting element PD 22 detecting the laser light reflected by the pit 20 through the condenser lens 21, the laminated quarter-wave plate 18, the collimator lens 17, and the mirror 15.

In the dual wavelength compatible optical pickup device according to the invention, the laminated quarter-wave plate used in the dual wavelength compatible optical pickup device has a wavelength band functioning as a phase difference of 90 degrees broadened, resulting in effects to function sufficiently as a quarter-wave plate to laser light and improve performance of the dual wavelength compatible optical pickup device even when a wavelength of the laser light emitted from an LD is changed toward a long wavelength due to a temperature drift.

Figure 5C:
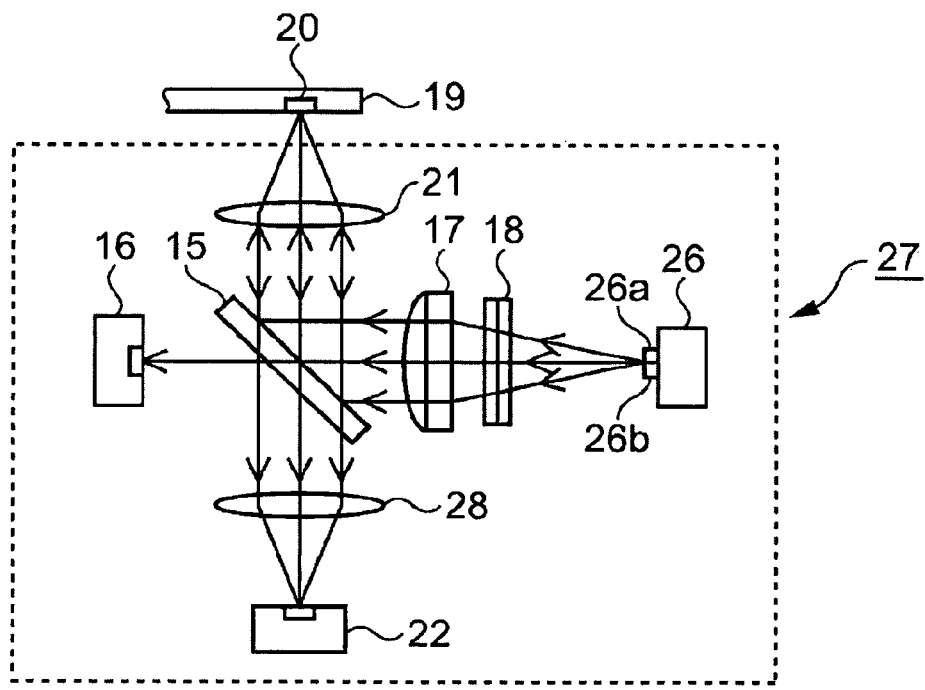
FIG. 5(c) is a block diagram showing a structure of an optical pickup device of a third embodiment of the invention.

FIG. 5(c) is a block diagram of a dual wavelength compatible optical pickup 27 in a third embodiment according to the present invention. The dual wavelength compatible optical pickup 27 is composed of the integrated LD 26 having the LDs 26a and 26b emitting linearly polarized laser light with wavelengths of 785 nm and 655 nm respectively corresponding to CDs and DVDs, the laminated quarter-wave plate 18 according to the invention converting either one of the linearly polarized laser light having 785 nm and 660 nm emitted from the integrated LD 26 to circularly polarized light, the collimator lens 17 collimating the circularly polarized laser light emitted from the laminated quarter-wave plate 18, the mirror 15 reflecting and transmitting the laser light transmitting through the collimator lens 17 at a predetermined ratio, the front monitor (FM) 16 monitoring the laser light transmitting through the mirror 15, the condenser lens 21 condensing the laser light reflected by the mirror 15 to the pit 20 formed on the optical disk 19, and the light detecting element PD 22 detecting the laser light reflected by the pit 20 through the condenser lens 21, the mirror 15, and a condenser lens 28.

In the dual wavelength compatible optical pickup device according to the invention, the laminated quarter-wave plate used in the dual wavelength compatible optical pickup device has a wavelength band functioning as a phase difference of 90 degrees broadened, resulting in effects to function sufficiently as a quarter-wave plate to laser light and improve performance of the dual wavelength compatible optical pickup device even when a wavelength of the laser light emitted from an LD is changed toward a long wavelength due to a temperature drift.

Further, the laminated quarter-wave plate 18 according to the invention is made by laminating a first wave plate and a second plate made of quartz crystal plates with a cutting angle of 90 Z, thereby having an extremely small incident angle dependence and thus not causing phase variation when laser light that is emitted light from the integrated LD 26 enters into the laminated quarter-wave plate 18, that is, even when the laser light enters obliquely into the incident plane of the laminated quarter-wave plate 18. Accordingly, the laminated quarter-wave plate 18 functions as a quarter-wave plate having a phase difference of 90 degrees and emits linearly polarized light entered into the laminated quarter-wave plate 18 as circularly polarized light, resulting in an effect to dramatically improve performance of the dual wavelength compatible optical pickup device.

Further, although the preferred embodiments of the invention are disclosed as above, the invention is not limited thereto. That is, the invention is described mainly according to the specific embodiments. However, those skilled in the art can add various modifications to the materials to be used, the shapes, the quantities, the wavelengths and other details in the embodiments described above without departing from the scope of technical ideas and purposes of the invention. Therefore, the descriptions to limit the materials and the shapes disclosed above are examples to facilitate understanding of the invention, not to limit to the invention. The invention thus includes the descriptions of the materials, the shapes, and the quantities without limitations in a part or a whole thereof.

The invention claimed is:

1. A laminated wave plate including a first wave plate having a phase difference of Γ1 and a second wave plate having a phase difference of Γ2 with respect to a wavelength λ, the first wave plate and the second wave plate being bonded together so that an optical axis of the first wave plate and an optical axis of the second wave plate intersect each other to function as a quarter-wave plate as a whole, the laminated wave plate comprising following equations from (1) to (6):

$$\Gamma1=360°\times(n1+1) \tag{1}$$

$$\Gamma2=90°\times(2\times n2+1) \tag{2}$$

$$\Delta\Gamma1=(\Gamma12a-\Gamma11a)/(\lambda12-\lambda11) \tag{3}$$

$$\Delta\Gamma 2=(\Gamma 12b-\Gamma 11b)/(\lambda 12-\lambda 11) \quad (4);$$

$$\cos 2\theta 1=1-(1-\cos \Delta\Gamma 2)/[2\times(1-\cos \Delta\Gamma 1)] \quad (5); \text{ and}$$

$$\theta 2=45° \pm 5° \quad (6),$$

wherein $\theta 1$ is an optic axis orientation of the first wave plate, $\theta 2$ is an optic axis orientation of the second wave plate, $\Gamma 11a$ is a phase difference of the first wave plate at the wavelength $\lambda 11$, $\Gamma 12a$ is a phase difference of the first wave plate at the wavelength $\Gamma 12$, $\Gamma 11b$ is a phase difference of the second wave plate at the wavelength $\lambda 11$, $\Gamma 12b$ is a phase difference of the second wave plate at the wavelength $\lambda 12$, and each of $\lambda 11<\lambda<\lambda 12$, n1, and n2 is a natural number starting from 1.

2. The laminated wave plate according to claim 1, wherein
n1=8;
n2=4;
$\Delta\Gamma 1$=4.34; and
$\Delta\Gamma 2$=1.09.

3. The laminated wave plate according to claim 1, wherein
n1=10;
n2=5;
$\Delta\Gamma 1$=5.43; and
$\Delta\Gamma 2$=1.36.

4. An optical pickup device comprising:
a laser light source,
an objective lens to condense emitted light from the laser light source to an optical storage medium,
a light detector to detect the emitted light condensed by the objective lens and reflected by the optical storage medium, and
a laminated wave plate according to claim 1 installed in a light way from the laser light source to the optical storage medium or a light way from the optical storage medium to the light detector.

5. An optical pickup device comprising:
a laser light source,
an objective lens to condense emitted light from the laser light source to an optical storage medium,
a light detector to detect the emitted light condensed by the objective lens and reflected by the optical storage medium, and
a laminated wave plate according to claim 2 installed in a light way from the laser light source to the optical storage medium or a light way from the optical storage medium to the light detector.

6. An optical pickup device comprising:
a laser light source,
an objective lens to condense emitted light from the laser light source to an optical storage medium,
a light detector to detect the emitted light condensed by the objective lens and reflected by the optical storage medium, and
a laminated wave plate according to claim 3 installed in a light way from the laser light source to the optical storage medium or a light way from the optical storage medium to the light detector.

7. A laminated wave plate including a first wave plate having a phase difference of $\Gamma 1$ and a second wave plate having a phase difference of $\Gamma 2$ with respect to a wavelength $\lambda$, the first wave plate and the second wave plate being bonded together so that an optical axis of the first wave plate and an optical axis of the second wave plate intersect each other to function as a quarter-wave plate as a whole, the laminated wave plate comprising following equations from (1), (2), (7) and (8):

$$\Gamma 1=360°\times(n1+1) \quad (1);$$

$$\Gamma 2=90°\times(2\times n2+1) \quad (2);$$

$$\theta 1=-5.5° \pm 5° \quad (7); \text{ and}$$

$$\theta 2=45° \pm 5° \quad (8),$$

wherein $\theta 1$ is an optic axis orientation of the first wave plate, $\theta 2$ is an optic axis orientation of the second wave plate, and each of n1, and n2 is a natural number starting from 1.

8. The laminated wave plate according to claim 7, wherein
n1=8;
n2=4.

9. The laminated wave plate according to claim 7, wherein
n1=10;
n2=5.

10. An optical pickup device comprising: a laser light source, an objective lens to condense emitted light from the laser light source to an optical storage medium, a light detector to detect the emitted light condensed by the objective lens and reflected by the optical storage medium, and a laminated wave plate according to claim 7 installed in a light way from the laser light source to the optical storage medium or a light way from the optical storage medium to the light detector.

11. An optical pickup device comprising: a laser light source, an objective lens to condense emitted light from the laser light source to an optical storage medium, a light detector to detect the emitted light condensed by the objective lens and reflected by the optical storage medium, and a laminated wave plate according to claim 8 installed in a light way from the laser light source to the optical storage medium or a light way from the optical storage medium to the light detector.

12. An optical pickup device comprising: a laser light source, an objective lens to condense emitted light from the laser light source to an optical storage medium, a light detector to detect the emitted light condensed by the objective lens and reflected by the optical storage medium, and a laminated wave plate according to claim 9 installed in a light way from the laser light source to the optical storage medium or a light way from the optical storage medium to the light detector.

* * * * *